Dec. 27, 1927.
S. P. SHELL
DRILL SET
Original Filed Dec. 7, 1925
1,653,786
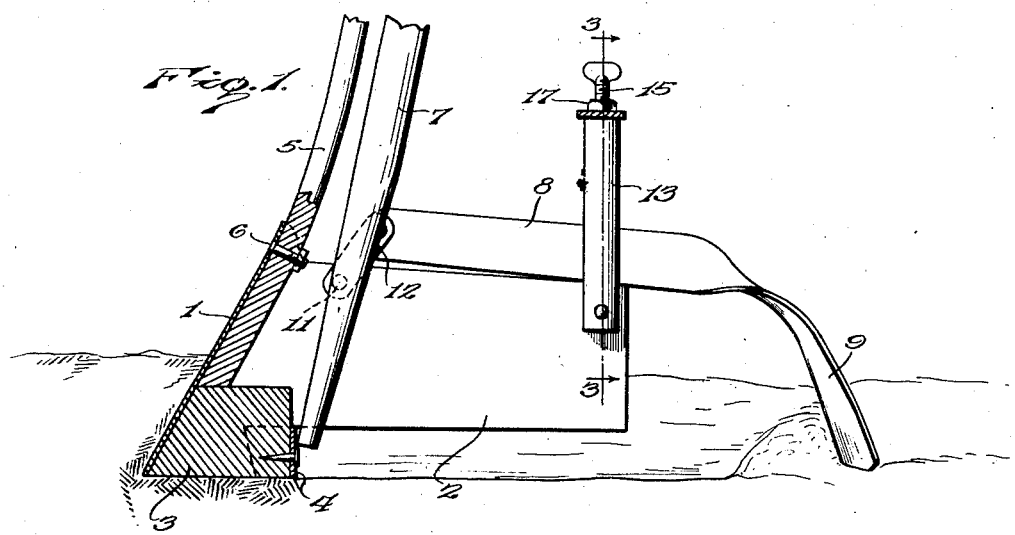
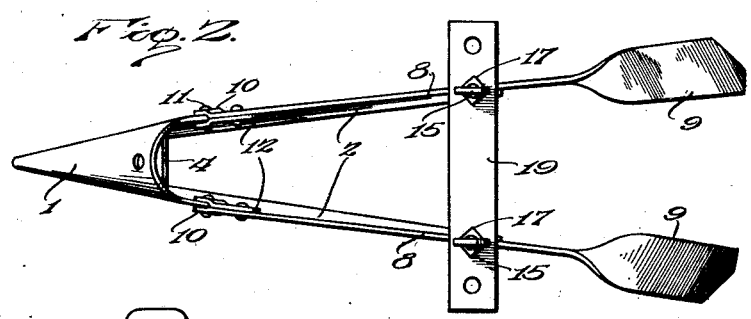
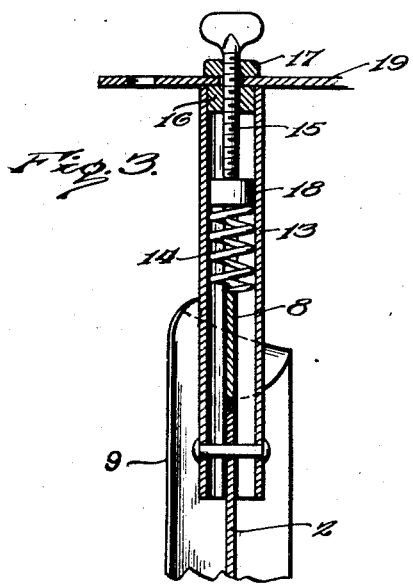
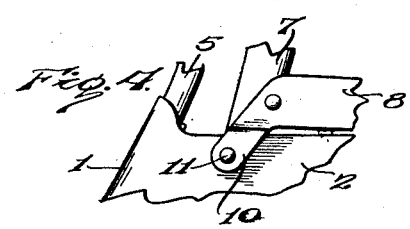
Inventor
S. P. Shell
By Lacey Lacey, Attorneys Patented Dec. 27, 1927.

1,653,786

UNITED STATES PATENT OFFICE.

SANDERS P. SHELL, OF ANNA, TEXAS.

DRILL SET.

Application filed December 7, 1925, Serial No. 73,840. Renewed October 27, 1927.

The invention has for its primary object to conserve moisture in the planting of seeds, thereby insuring germinating in arid sections and during a drought.

The invention provides a planter which prepares a bed for the seeds, the latter being covered with as little disturbance as possible, both to the seeds and the bed, thereby preventing rapid dissipation of the moisture.

While the drawings illustrate a preferred embodiment of the invention it is to be understood that in adapting the means to meet specific needs and requirements the structure may be varied, and such other changes in the minor details of construction may be resorted to within the scope of the invention as claimed, without departing from the spirit thereof.

For a full understanding of the invention and the merits thereof, reference is to be had to the following description and the drawings hereto attached, in which,—

Figure 1 is a side view of a planter embodying the invention, the near wing being omitted, and a portion of the standard being broken away and the bed forming point being in section.

Figure 2 is a top plan view of the planter.

Figure 3 is an enlarged sectional view on the line 3—3 of Figure 1, looking in the direction of the arrows, Figure 4 is a fragmentary elevational view showing more clearly the pivotal connection between the front end of the coverers and the wings of the runner and, Figure 5 is a fragmentary view of the forward portion of the runner inverted, or as seen from the bottom side.

Corresponding and like parts are referred to in the following description and indicated in the several views of the drawings by like reference characters.

The planter consists of a runner embodying an opener 1 and wings 2, said parts being preferably formed of a sheet metal blank doubled upon itself, the fold corresponding to the opener 1 which inclines upwardly and rearwardly and the folded portions constituting the wings 2 which flare rearwardly. The lower edges of the wings 2 are in a higher plane than the lower edges of the opener 1, as indicated most clearly in Figure 1, and this is of advantage as it prevents the earth falling upon and disturbing the bed of the furrow and the seed deposited thereon. A filler 3 occupies the space formed between the lower side portion of the opener 1 and this filler consists of a block having its lower side in the same plane as the lower edges of the side portions of the opener 1. The filler 3 reinforces the lower portion of the opener 1 and forms the bed of the furrow provided to receive the seed, said bed being thus slightly compressed to retain the moisture and prevent rapid dissipation thereof. A U-shaped reinforcing strap 4 extends along the rear and opposite sides of the filler 3 and is attached thereto, as shown most clearly in Figure 5, and serves to prevent rapid wear of the filler. A standard 5 is attached to the opener by a heel bolt 6, in a manner well understood in the art, and this standard has its lower end in contact with the filler 3 and snugly fits within the opener 1. The numeral 7 designates a seed spout, or tube, by means of which the seed is delivered into the furrow immediately in the rear of the bed forming point represented by the filler 3.

Two coverers are provided, one for each of the wings 2, and are disposed to operate upon opposite sides of the furrow to effect discharge of the earth therein to cover the seeds. These coverers are of similar formation and each is pivoted to a wing 2 and a spring is associated with each of the coverers to yieldably hold it in working position. Each of the coverers consists of an arm 8 and a blade 9, the same being formed from a metal strap having an end portion twisted and curved to form the blade 9. Each of the coverers 8 has a forwardly and downwardly inclined extension 10 which is laterally offset and pivoted to a wing 2, at 11. A link 12 is connected to each of the arms 8 adjacent the extension 10 and parallels the latter and engages the inner side of the wing 2 to which it is connected by the fastener 11. It will thus be understood that each of the wings 2 is comprised between an extension 10 of an arm 8 and a link 12, as shown most clearly in Figure 2. The arms 8 are in the planes of the respective wings 2 and the blades 9 are oppositely inclined so as to move the earth inwardly to fill the furrow and cover the seed.

A guide tube 13 extends vertically from the rear end of each of the wings 2 and is longitudinally slotted to receive the arm 8 of a coverer. Each of the tubes 13 receives a spring 14 which is arranged to exert a downward pressure upon the coverer and hold the same to the ground with a yielding pressure depending upon the tension of the spring 14 which is regulated by means of a set screw 15 threaded into a plug 16 closing the upper end of the tube 13. The set screw is held in the adjusted position by means of a binding nut 17. A plug 18 loose in the guide tube 13 engages the upper end of the spring 14 and the lower end of the set screw 15. A cross bar 19 connects the upper ends of the guide tubes 13 and provides means for attaching the contrivance to a planter or the agricultural implement with which the device is to be used.

The device is in the nature of an attachment to be applied to any planter or other suitable agricultural implement equipped with a seed distributing mechanism and as the device is drawn over the field, the opener 1 forms the furrow and the part 3 rides upon the bottom of the furrow and compresses the same to form the bed to receive the seed which is deposited thereon by the spout 7. The wings 2 being elevated above the bed of the furrow prevent the loose earth from falling upon the bed and seed and disturbing the same. The earth is moved inward by the blades 9 and drops into the furrow and covers the seed in a manner well understood.

Having thus described the invention, I claim:

1. A planter comprising an opener and side wings, guide tubes rising from the wings and longitudinally slotted, coverers pivoted at their forward ends to the wings and passing through the slots of the guide tubes, springs within the guide tubes and adapted to exert a downward pressure upon the coverers and means for adjusting the tension of said springs.

2. A planter comprising a runner including an opener and side wings, guide tubes rising from the wings and longitudinally slotted, coverers, each including an arm and a blade, the arms having a forward extension which is pivoted to one of the wings of the runner, a link attached at one end to each of the arms and at its other end to a wing, the wings of the runner being disposed between the links and forward extension of the arms, springs in the guide tubes and set screws for regulating the tension of the springs.

In testimony whereof I affix my signature.

SANDERS P. SHELL. [L. S.]